Figure 1:
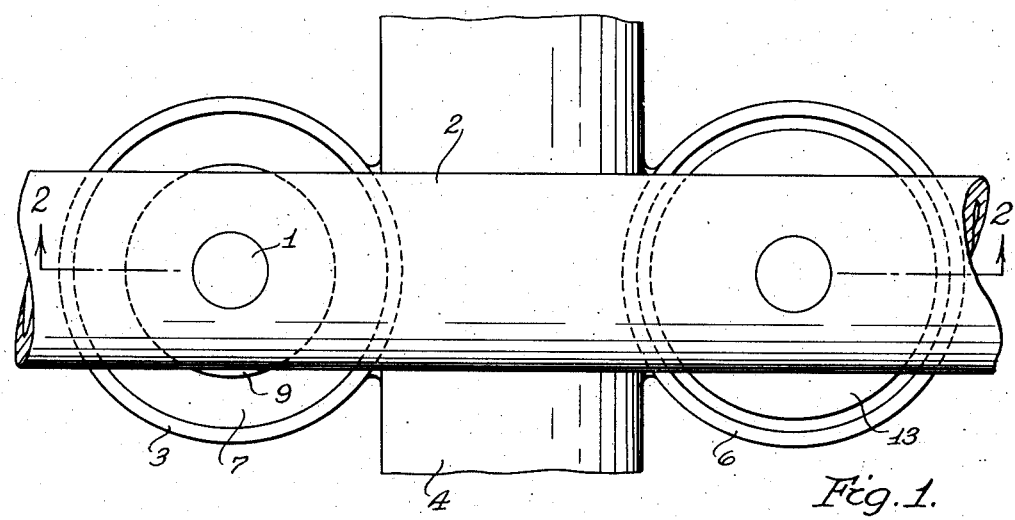

June 29, 1943. E. H. PIRON 2,322,879
COMBINED STEEL AND RUBBER SPRING
Filed April 2, 1940 2 Sheets-Sheet 1

INVENTOR.
Emil H. Piron
BY
ATTORNEY.

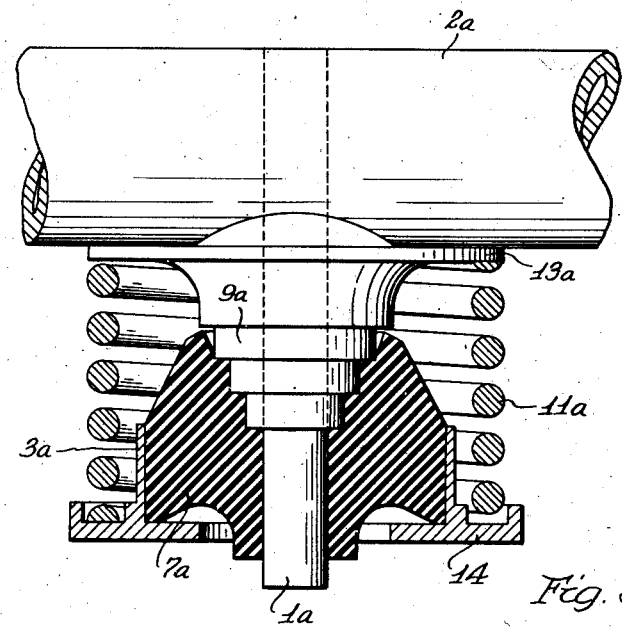
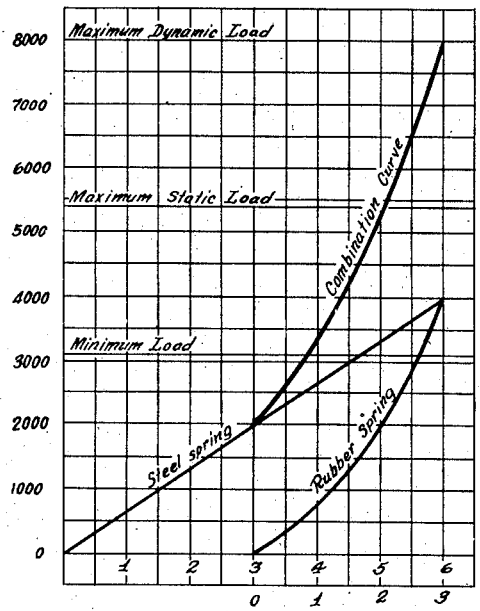

Patented June 29, 1943

2,322,879

UNITED STATES PATENT OFFICE 2,322,879

COMBINED STEEL AND RUBBER SPRING

Emil H. Piron, New York, N. Y., assignor to Transit Research Corporation, a corporation of New York Application April 2, 1940, Serial No. 327,477

15 Claims. (Cl. 267—33)

This invention relates to vehicle springs and has for its primary object to provide a spring, suitable for use on vehicles, and particularly rail vehicle trucks in the springing system of which it is desired to have a load deflection ratio which increases with increased loading.

More specifically, the main object is to provide a combination steel and rubber spring, the term "steel" as here used being intended to generally designate coil springs, and the term "rubber" being intended to generally designate rubber or any equivalent or substitute material. According to this object, the invention provides a steel spring, having a constant load deflection ratio, in combination with a rubber spring having a load deflection ratio which increases with the load. This results in a combined load deflection ratio which likewise increases with the load.

An important factor which must be taken into consideration in the design of rubber springs is creep. When a piece of rubber is strained, by application of a load thereto, the deflection does not stop when the load becomes constant, but continues as long as the load is maintained, but at a rate decreasing in time. This characteristic, commonly called creep, is also called slip or cold flow, and is distinguished from the elastic deflection of the rubber by the factor of time. The result of this phenomenon is that the rubber does not instantly regain its previous dimensions when the load is removed. The part of the distortion which is elastic deflection disappears immediately, while the creep distortion disappears progressively. Another object of the invention is to reduce the creep, and in some cases to practically eliminate it. For this purpose the steel and rubber springs are so correlated that the rubber spring is partially or completely relieved of stresses when the vehicle is emptied of its commercial loading, the load being then partially or entirely supported by the steel spring.

Another object is to provide a combination steel and rubber spring in which the major portion of the service load is imposed upon the steel spring, thus reducing the service stresses of the rubber spring, and increasing its useful life.

In the case of street car trucks limitations of design and available space, etc., make difficult the provision of a spring having the desired load deflection ratio under all conditions of loading. This invention has for another object to teach the formation of a composite spring employing a combination of steel and rubber springs in a manner making it much easier to obtain a valuable load deflection ratio in the presence of existing limitations and available space. In other words, the invention makes possible the obtaining of load deflection curves with proper load deflection rates under various loads which, otherwise, would be difficult, if not impossible, to obtain with steel springs or rubber springs alone.

In the case of a steel spring, interposed between a supporting member and a spring supported member, and providing vertical flexibility, it is necessary in general to provide guides or articulations between the supporting and supported members to prevent relative horizontal displacement thereof. The invention has as a further object to combine, with the steel spring, a rubber spring which accomplishes the purpose above mentioned, and also for the purpose of elastically opposing forces so directed that they would produce horizontal displacements between the supported and supporting members. In this manner the necessity for guides or articulations between the supported and supporting members is made unnecessary.

Figure 2:
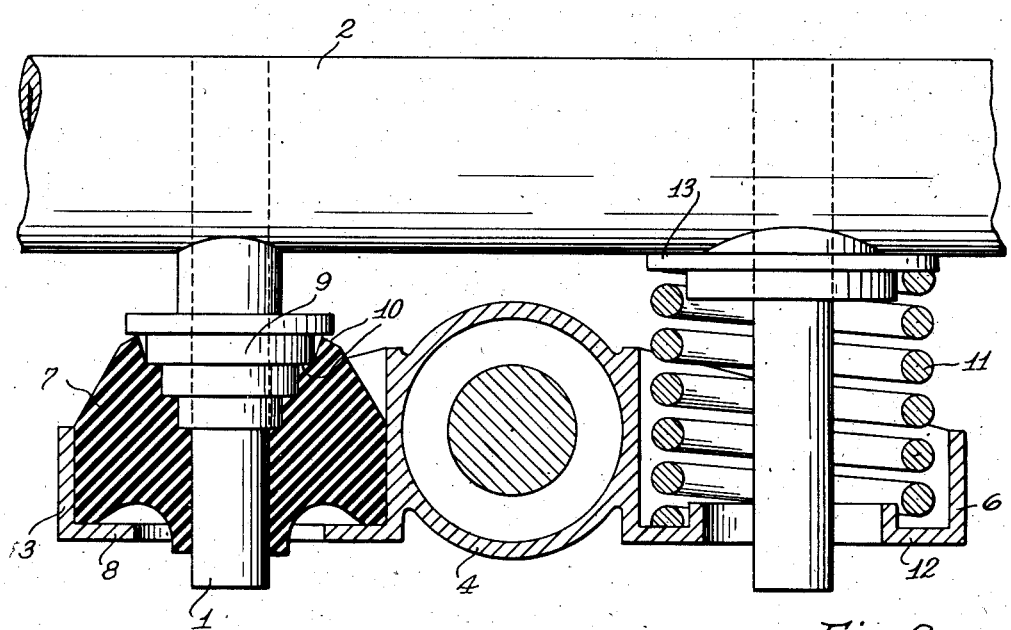
Figures 5, 6:
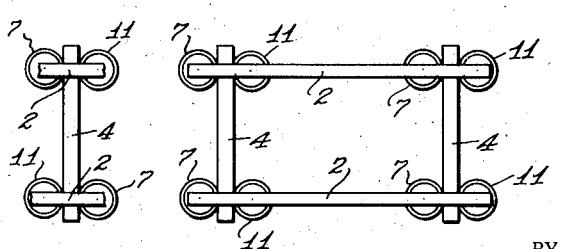

Other objects and advantages will become more fully apparent as reference is had to the accompanying drawings wherein my invention is illustrated, and in which:

Fig. 1 is a plan view illustrating a fragment of a truck frame supported from an axle housing by a combined rubber and steel springing unit, Fig. 2 is a vertical section, taken on the line 2—2 of Fig. 1, Fig. 3 is a vertical section illustrating a nested arrangement of the steel and rubber springs, Fig. 4 is a chart illustrating the load deflection curves, Fig. 5 is a plan view showing springs assembled at both ends of an axle housing, and Fig. 6 is a plan of a truck, illustrating the spring assembly in conjunction with two axles.

Referring to Figs. 1 and 2, 1 designates a shaft of metal or its equivalent, having its upper end secured to an element 2 which represents, for example, a frame member of a rail vehicle truck, and which is hereinafter referred to as the supported member. The lower end of the shaft 1 extends loosely through a cylinder 3 mounted on an element 4, which represents an axle housing on a rail vehicle truck. Another cylinder 5 is mounted on the axle housing on the other side and is similar to cylinder 3. Both cylinders 3 and 5 are hereinafter referred to as load supporting members. The cylinder 3 contains a rubber spring and the cylinder 5 contains a steel spring.

The rubber spring employed is of a type having a load deflection ratio which increases with the load. The spring here shown is substantially identical to the spring disclosed and claimed in my Patent No. 2,245,295, issued June 10, 1941, and is similar in many respects to the spring disclosed and claimed in my Patent No. 2,245,296, issued June 10, 1941.

Briefly described, the rubber spring comprises an elastic mass 7, of generally frusto-conical form, whose surfaces contact the shaft 1 and the inner surface of the cylinder 3. Beneath the mass 7 the cylinder 3 is formed with a flange 8, and secured to the shaft 1 above the mass is a load imposing member 9 having one or more steps.

The upper surface of the mass is formed with or more steps 10, corresponding in number to the number of steps on the member 9, which are originally of frusto-conical form and separated by frusto-conical risers. The spring is shown in a loaded condition to illustrate the manner in which the steps of the elastic plastic mass are progressively engaged by the stepped member 9. In the position shown, the uppermost step 10 and its riser portion are still unseated and may be taken to represent the shape of the other steps 10 prior to deflection thereof.

As is shown and explained in detail in my Patent No. 2,245,295, the stepped member 9 and the steps 10 are so correlated that they function to limit distortion of the elastic material in different regions successively, as a result of application of a load thereto. That is, as one region is subjected to a safe load the lowermost step 10 seats against the lowermost step on the stepped member 9, and this region becomes stabilized against further distortion. Following stabilization of the first region, an added load causes stabilization of a second region, and the remaining steps function in like manner. The result is that the typical load deflection curve of this spring may be altered to obtain softness under light loads and increasing stiffness under increasing loads, or, in other words, a load deflection ratio which increases with the load.

A steel coiled spring 11 is mounted in the cylinder 6, and is compressed between a flange 12 on the lower end of the cylinder 6 and a spring seat member 13 secured to the supported member 2.

In some installations it is desirable to provide a unitary assembly of the steel and rubber springs, as illustrated in Fig. 3. In this case a rubber spring 7a is mounted in a cylinder 3a and coacts with a stepped member 9a on a shaft 1a which is secured to the supported element 2a. The cylinder 3a has an outwardly extending flange 14, and a steel coiled spring 11a is compressed between the flange 14 and a spring seat member 13a attached to the member 2a.

It is evident that, in both forms described above, both springs are so related that their main deflections are in a direction axial with respect to the shaft 1 or 1a. The rubber spring also acts to resiliently oppose relative movement of the shafts and cylinders in directions radial with respect to the shafts.

Vehicle springs having a constant load deflection ratio result in a riding quality which is relatively hard under light loads and becomes increasingly softer under heavier loads. It is desirable, of course, to maintain the riding quality substantially constant, regardless of the load carried, and the present springs are so designed that the riding quality is maintained substantially constant. As shown in Fig. 4, the steel spring has a constant load deflection ratio, and the rubber spring has a load deflection ratio which increases in value with the load. The springs, as is hereinafter explained more in detail, are so arranged that the rubber springs begin to act after the steel springs have been compressed a predetermined amount. The combined curve, starting at zero, increases at a constant rate until the rubber spring begins to act, and from that point the curve increases at a rate different from the rate of either spring.

In obtaining the desired distribution of the load between the two springs, means must be provided for maintaining the member 2 substantially parallel to the flanges 8 and 12 of the load supporting members 3 and 6. In rail trucks this condition may be realized by the action of the assembly at the other axle, or by placing one kind of spring, the steel spring for instance in front of the axle 3 at one end thereof and in the rear at the other end. This is more particularly explained later.

An example of the ratios found satisfactory for street car use is illustrated in the chart of Fig. 4. The steel spring has a constant load deflection ratio of 666 lbs. per inch and the rubber spring has the following reactions:

Deflection 1 inch, reaction 700 lbs.
Deflection 2 inches, reaction 2000 lbs.
Deflection 3 inches, reaction 4000 lbs.

The springs are so arranged that the rubber spring starts to function when the steel spring is deflected 3 inches, and the total reactions are as follows:

| Deflection | | Reaction | | |
|---|---|---|---|---|
| Steel | Rubber | Steel | Rubber | Total |
| Inches | Inches | Pounds | Pounds | Pounds |
| 3 | 0 | 2,000 | 0 | 2,000 |
| 4 | 1 | 2,333 | 300 | 2,633 |
| 5 | 2 | 3,333 | 2,000 | 5,333 |
| 6 | 3 | 4,000 | 4,000 | 8,000 |

It will be seen from the foregoing that, with the spring assembly here disclosed, it is possible to correlate a rubber spring, having a load deflection rate increasing with the load, so that its use in combination with a spring having a constant load deflection ratio it gives a load deflection curve with a load deflection rate increasing in a predetermined manner with the load.

With a load distribution such as above described, wherein the steel spring is initially compressed, there is a tendency for the member 2 to become displaced from its normal parallel relationship with the flanges 8 and 12 of the load supporting members 3 and 6. This is because the reaction of the steel spring is initially greater than the reaction of the rubber spring, and if a single unit such as shown in Fig. 2 is considered in the absence of any other truck structure, the steel spring would act to compress the rubber spring. However, it is pointed out that this would defeat the purpose of the invention, and it is contemplated that such an action be prevented in the final truck assembly.

As shown in Fig. 5, at one end of the axle housing 4 steel spring 11 is mounted in front and a rubber spring 7 is mounted behind. At the other end of the axle housing the order is reversed, and a rubber spring 7 is mounted in front and a steel spring 11 is mounted behind the axle housing. With the springs so arranged the forces exerted by the two compressed steel springs counteract one another, and the flanges 9 and 12 remain parallel with the member 2.

In a truck having two axle housings arranged fore and aft with respect to a pair of side frame members, such as illustrated in Fig. 6, the assembly at one end of the frame members counteracts the assembly at the other end, and the arrangement of the springs is determined by the matter of convenience in assembly.

In applying a load upon a spring unit, the steel and rubber springs may be said to act in parallel, in the respect that the effects of loading are divided and distributed through both springs, and also in the respect that in Fig. 2 the springs are arranged in parallel or side by side relation on opposite sides of the axle housing so that they share the load jointly. However, the steel spring is compressed a predetermined amount before any load is applied to the rubber spring, and in this respect it might be stated that the two springs act in series to the extent that one deflects first. As explained above, the two springs are so correlated that they both function to support the normal static light load, which will be the weight of the empty car body and the means which supports it on the frame members. Therefore, when the springs are in use, both function jointly in the support of the load.

What is claimed is:

1. A composite spring assembly adapted to support a supported member on a supporting member, comprising a metal spring having a constant load deflection ratio, a rubber spring, means for varying the load deflection rate of said rubber spring to provide a load deflection rate which increases with the load according to a selected curve, and means for mounting the spring assembly between the supported and supporting members for joint action and in such manner that when a load is initially applied the metal spring is deflected a predetermined amount prior to any deflection of the rubber spring.

2. In combination, a supporting member, a supported member, a composite spring between said members, said composite spring comprising a spring having a constant load deflection ratio, and a springing element composed of a mass of elastic plastic material having concentric cylindrical inner and outer surfaces secured to parts of the supporting and supported members, said mass having generally conical top and bottom surfaces, one of said conical surfaces having at least one step thereon, and deflection limiting means coacting with said step.

3. A composite spring comprising concentric cylindrical elements connected to a supporting member and a supported member respectively, said cylindrical elements being separated by a springing element composed of a mass of elastic plastic material having cylindrical inside and outside surfaces contacting the outside and inside surfaces respectively of said cylindrical elements, said mass having generally conical top and bottom surfaces, one of the latter surfaces having steps therein, deflection limiting means on one of said elements for coaction with said steps, and a second spring interposed between the supporting and supported members to act jointly with the first named springing element, said second spring having a constant load deflection ratio.

4. A composite spring comprising concentric cylindrical elements connected to a supporting member and a supported member respectively, said cylindrical elements being separated by a springing element composed of a mass of elastic plastic material having cylindrical inside and outside surfaces contacting the outside and inside surfaces respectively of said cylindrical elements, said mass having generally conical top and bottom surfaces, one of the latter surfaces having steps therein, deflection limiting means on one of said elements for coaction with said steps, and a second spring interposed between the supporting and supported members to act jointly with the first named springing element, said second spring having a constant load deflection ratio and said second spring being so arranged that in the presence of loading it deflects a predetermined amount prior to any deflection of the elastic plastic springing element.

5. In combination, an axle housing, a cylindrical member arranged on each side of said housing, a frame member, a shaft depending from said frame member and extending loosely through one cylindrical member, a coiled spring in the other cylindrical member and engaging said frame member, a plastic elastic mass in the cylindrical member traversed by the shaft, said mass having its outer surface contacting the inner surface of its cylindrical member and its inner surface contacting the shaft which extends therethrough, and said mass having generally conical top and bottom surfaces.

6. In combination, an axle housing, a cylindrical member arranged on each side of said housing, a frame member, a shaft depending from said frame member and extending loosely through one cylindrical member, a coiled spring in the other cylindrical member and engaging said frame member, an elastic plastic mass in the first cylindrical member, said mass having its outer surface contacting the inner surface of said first cylindrical member and its inner surface contacting the shaft which extends therethrough, and said mass having generally conical top and bottom surfaces, said coiled spring being so arranged that in the presence of loading it deflects a predetermined amount prior to any deflection of the elastic mass.

7. In combination, an axle housing, a cylindrical member arranged on each side of said housing, a frame member, a shaft depending from said frame member and extending loosely through one cylindrical member, a coiled spring in the other cylindrical member and engaging said frame member, an elastic plastic mass in the first cylindrical member, said mass having its outer surface contacting the inner surface of its cylindrical member and its inner surface contacting the shaft which extends therethrough, and said mass having generally conical top and bottom surfaces, one of said latter surfaces having steps therein, and deflection limiting means coacting with said steps.

8. In combination, an axle housing, a cylindrical member arranged on each side of said housing, a frame member, a shaft depending from said frame member and extending loosely through respective cylindrical member, a coiled spring in the other cylindrical member and engaging said frame member, a plastic elastic mass in the first cylindrical member, said mass having its outer surface contacting the inner surface of the first cylindrical member and its inner surface contacting the shaft which extends therethrough, and said mass having generally conical top and bottom surfaces, one of said latter surfaces having steps therein, and deflection limiting means coacting with said steps, said coiled spring being so arranged that in the presence of loading it deflects a predetermined amount prior to any deflection of the elastic mass.

9. In combination, concentric cylindrical load imposing and load receiving members separated by a springing element composed of a mass of elastic plastic material having cylindrical inside and outside surfaces contacting the outside and inside surfaces respectively of said load imposing and load receiving members, said mass having generally conical top and bottom surfaces, and a metal coil spring interposed between said load imposing and receiving members in substantially concentric arrangement with the cylindrical load imposing and load receiving members.

10. In combination, concentric cylindrical load imposing and load receiving members separated by a springing element composed of a mass of elastic plastic material having cylindrical inside and outside surfaces contacting the outside and inside surfaces respectively of said load imposing and load receiving members, said mass having generally conical top and bottom surfaces, at least one of said latter surfaces having steps therein, deflection limiting means on one of said members for coaction with said steps, and a metal coil spring interposed between said load imposing and receiving members in substantially concentric arrangement with the cylindrical load imposing and load receiving members.

11. In combination, concentric cylindrical load imposing and load receiving members separated by a springing element composed of a mass of elastic plastic material having cylindrical inside and outside surfaces contacting the outside and inside surfaces respectively of said load imposing and load receiving members, said mass having generally conical top and bottom surfaces, and a metal coil spring interposed between said load imposing and receiving members in substantially concentric arrangement with the cylindrical load imposing and load receiving members, said coiled spring being so arranged that in the presence of loading it deflects a predetermined amount prior to any deflection of the elastic mass.

12. In combination, concentric cylindrical load imposing and load receiving members separated by a springing element composed of a mass of elastic plastic material having cylindrical inside and outside surfaces contacting the outside and inside surfaces respectively of said load imposing and load receiving members, said mass having generally conical top and bottom surfaces, at least one of said latter surfaces having steps therein, deflection limiting means on one of said members for coaction with said steps, and a metal coil spring interposed between said load imposing and receiving members in substantially concentric arrangement with the cylindrical load imposing and load receiving members, said coiled spring being so arranged that in the presence of loading it deflects a predetermined amount prior to any deflection of the elastic mass.

13. In combination in a vehicle springing system, load transmitting members and load receiving members having springs therebetween, one of said springs being of the constant load deflection ratio type, the other of said springs being of rubber-like material, and means carried by one of said members imposing loading on an area of said other spring which increases with increasing vertical load.

14. In combination in a vehicle springing system, load transmitting members and load receiving members having springs therebetween, one of said springs being of the constant load deflection ratio type, the other of said springs being of rubber-like material, means carried by one of said members imposing loading on an area of said other spring which increases with increasing vertical load, and means carried by one of said members extending through said rubber-like spring for transmitting all relative horizontal movements between said members thereto.

15. In combination in a vehicle springing system, load transmitting members and load receiving members having springs therebetween, one of said springs being of the coiled steel type and adapted to deflect according to a constant load deflection ratio, the other of said springs being of a rubber-like material and being adapted to deflect under vertical loading by a combination of shear and bending stresses, and means carried by one of said members for contacting an area of said other spring which increases with increasing vertical deflection whereby the proportion of shear to bending stresses progressively changes.

EMIL H. PIRON.